(12) United States Patent
Papadopoullos et al.

(10) Patent No.: US 9,715,493 B2
(45) Date of Patent: Jul. 25, 2017

(54) METHOD AND SYSTEM FOR MONITORING SOCIAL MEDIA AND ANALYZING TEXT TO AUTOMATE CLASSIFICATION OF USER POSTS USING A FACET BASED RELEVANCE ASSESSMENT MODEL

(71) Applicants: Alkis Papadopoullos, Outremont (CA); Patrick Plante, Deux-Montagnes (CA)

(72) Inventors: Alkis Papadopoullos, Outremont (CA); Patrick Plante, Deux-Montagnes (CA)

(73) Assignee: SEMEON ANALYTICS INC., Montreal (CA)

( * ) Notice: Subject to any disclaimer, the term of this patent is extended or adjusted under 35 U.S.C. 154(b) by 0 days.

(21) Appl. No.: 14/432,397

(22) PCT Filed: Sep. 30, 2013

(86) PCT No.: PCT/CA2013/000829
§ 371 (c)(1),
(2) Date: Mar. 30, 2015

(87) PCT Pub. No.: WO2014/047727
PCT Pub. Date: Apr. 3, 2014

(65) Prior Publication Data
US 2015/0254230 A1    Sep. 10, 2015

Related U.S. Application Data

(60) Provisional application No. 61/707,674, filed on Sep. 28, 2012.

(51) Int. Cl.
*G06F 17/27*   (2006.01)
*G06F 17/30*   (2006.01)

(52) U.S. Cl.
CPC ........ *G06F 17/2785* (2013.01); *G06F 17/275* (2013.01); *G06F 17/30011* (2013.01);
(Continued)

(58) Field of Classification Search
USPC ...................................... 704/1–10
See application file for complete search history.

(56) References Cited

U.S. PATENT DOCUMENTS

2003/0078899 A1* 4/2003 Shanahan ......... G06F 17/30707
706/8

* cited by examiner

*Primary Examiner* — Abul Azad
(74) *Attorney, Agent, or Firm* — Brouillette Legal Inc.; Robert Brouillette

(57) ABSTRACT

A social media monitoring and text analysis method for automated classification of user posts on the web, using a facet based relevance assessment model, comprise a semantic indexing server, which builds a faceted classification index of text objects, and a query server, which receives and analyzes the user's query. A query thus processed is then sent from the query server to the semantic indexing server through an interface in order to perform a search in the faceted classification index. The search system and method further comprise a result handler, which provides the user with a search result set comprising a list of unexpected links and a list of result elements. The list of unexpected links corresponds to filters which allow the user to narrow down or refine the original query. The quality of unexpected links depends on identification of the most likely topical area of focus related to the query concepts and corresponding concepts in user posts, and this achieved by ensuring that we measure statistical co-occurrence of concepts in user posts, assign weighted scores based on information gain and semantic density, thus establishing a relevant conceptual tag cloud that is used validate topical focus against a set of industry specific taxonomies or ontologies.

17 Claims, 9 Drawing Sheets

(52) U.S. Cl.
CPC .... *G06F 17/3071* (2013.01); *G06F 17/30613* (2013.01); *G06F 17/30657* (2013.01); *G06F 17/30684* (2013.01); *G06F 17/30722* (2013.01); *G06F 17/30994* (2013.01)

FIGURE 3

Tag Cloud   Documents

Categories in the same documents as HMS IntegritySourceSM rollout (45)

Affordable Care Act requirements all rights annual conference Centers for Medicare and Medicaid Services claims payment claims payment accuracy clinical program services CMS commercial and government payers commercial insurers complex clinical reviews financial audits fraud, waste and abuse portal fraud, waste, abuse identification and prevention Health Market Health Market Science healthcare payers HMS Debuts HMS IntegritySourceSM Payment Integrity Suite HMSY identify at-risk providers integrated solution Integrity Suite key components of IntegritySourceSM launch and track investigations many solutions Medicaid Recovery Audit Contractor monitor providers NASDAQ National Association for Medicaid Program Integrity net return new solution one data Payer payment integrity solutions program source one-stop shop partners Digital Harbor screening provider targeting Significant step track investigations services provider scorecards provider

METHOD AND SYSTEM FOR MONITORING SOCIAL MEDIA AND ANALYZING TEXT TO AUTOMATE CLASSIFICATION OF USER POSTS USING A FACET BASED RELEVANCE ASSESSMENT MODEL

CROSS-REFERENCE TO RELATED APPLICATIONS

The present patent application claims the benefits of priority of U.S. Provisional Patent Application No. 61/707,674, entitled "Social Media Monitoring and Text Analysis System and Method for Automated Classification of User Posts using a Facet based Relevance Assessment Model" and filed at the United State Patent and Trademark Office on Sep. 28, 2012, the content of which is incorporated herein by reference.

FIELD

The present invention generally relates to searches conducted on the World Wide Web (or the Web) or other networks. More specifically, the present invention is concerned with an automated text analysis algorithm for uncovering the most relevant possible concepts and topics within threaded user posts on blogs, forums, customer review sites and social networks.

BACKGROUND

With the advent of the Internet and of the Web, an incredibly large amount of information is available to each user connected thereto. However, a drawback of this huge available amount of information is that it is often difficult and time consuming to identify the most relevant user posts, comments or reviews. Indeed, often each comment, post or review is linked to many others via direct references or anaphora.

Many search engines have been developed for conducting searches on the Web. For example, search engines are used to locate texts, images or videos stored on personal computers, corporate intranets computers and networks such as the World Wide Web using keywords. In order to simplify searches, classification is of primary importance. Indeed, a good classification allows for easily finding and discovering documents including keywords searched by the users.

For example, faceted metadata classification is often used to organize and present web content in e-commerce environments, where products can easily be, for presentation purposes, broken down into their respective features. The respective features are generally represented in a vector form, which allows for easily locating a particular product having those features or aspects searched by the user. Those features or aspects are typically referred to as facets.

Several methods or approaches for automated classification of documents have been attempted based either on the sole use of large scale ontologies, thesauri or taxonomies, in order to predefine associations between concepts and assist with the determination of most relevant categories based on presence within these knowledge representation structures. It is believed that these approaches face severe limitations due to the difficulty in maintaining these often very large structures, in particular in the context of quickly evolving language (new acronyms, initialisms appearing daily, neologisms, etc.) and also as relates to localization of structures. Ensuring that they are as effective across multiple languages makes for very labour-intensive efforts to maintain, translate and update these structures.

Several methods or approaches for automated classification of documents have also been based solely on machine learning approaches (unsupervised, semi-supervised and supervised), and though these approaches can compensate more adequately for concepts that would otherwise be missing in knowledge representation structures, in order to work with satisfactory accuracy, require extensive corpora for training purposes and suffer from this dependency on the corpus data itself. Numerous examples can be shown where associations between concepts based on these approaches is limited to the training set that was used and therefore do not evolve well as real data changes and evolves over time. They require frequent retraining across large corpora of documents which are again very labour intensive in terms of collection and organization.

Therefore, there is a need of overcoming the above-discussed drawbacks related to classifying and searching user posts on the web. Accordingly, a search system and method using a faceted classification of text objects for uncovering unexpected links between different concepts related to one or many user posts are sought. In particular the manner with which the drawbacks of each of the above approaches or methods is key to the invention and will be further detailed below.

The foregoing and other aspects, advantages and features of the present invention will become more apparent upon reading of the following non-restrictive description of illustrative embodiments thereof, given by way of example only with reference to the accompanying drawings.

SUMMARY OF THE INVENTION

The features of the present invention which are believed to be novel are set forth with particularity in the appended claims.

One of the aspect of the present invention is a method for automated classification of documents and to automate classification of users posts provided on a network, the method comprising steps to detect the one or more languages of the documents to be classified, discover one or more sentence within the one or more documents, classify text objects contained in the documents using a faceted classification and by discovering the polarity and objectivity of the documents and to categorize the documents by extracting the categories from the documents.

Another aspect of the present invention is a system for conducting a query-based search in documents provided on a network, the system comprising a semantic indexing server, wherein the semantic indexing server is configured to detect the one or more languages of the documents to be classified, to discover one or more sentence within the one or more documents, to classify text objects contained in the documents using a faceted classification and by discovering the polarity and objectivity of the documents ant to categorize the documents by extracting the categories from the documents. The system further comprises a query server configured to identify the determined precursor in the faceted classification and a result handler configured to return both a set of text objects related to the identified precursor and a set of unexpected results defined by facets and facet values associated with the determined precursor.

BRIEF DESCRIPTION OF THE DRAWINGS

The above and other aspects, features and advantages of the invention will become more readily apparent from the following description, reference being made to the accompanying drawings in which:

Figure 3:
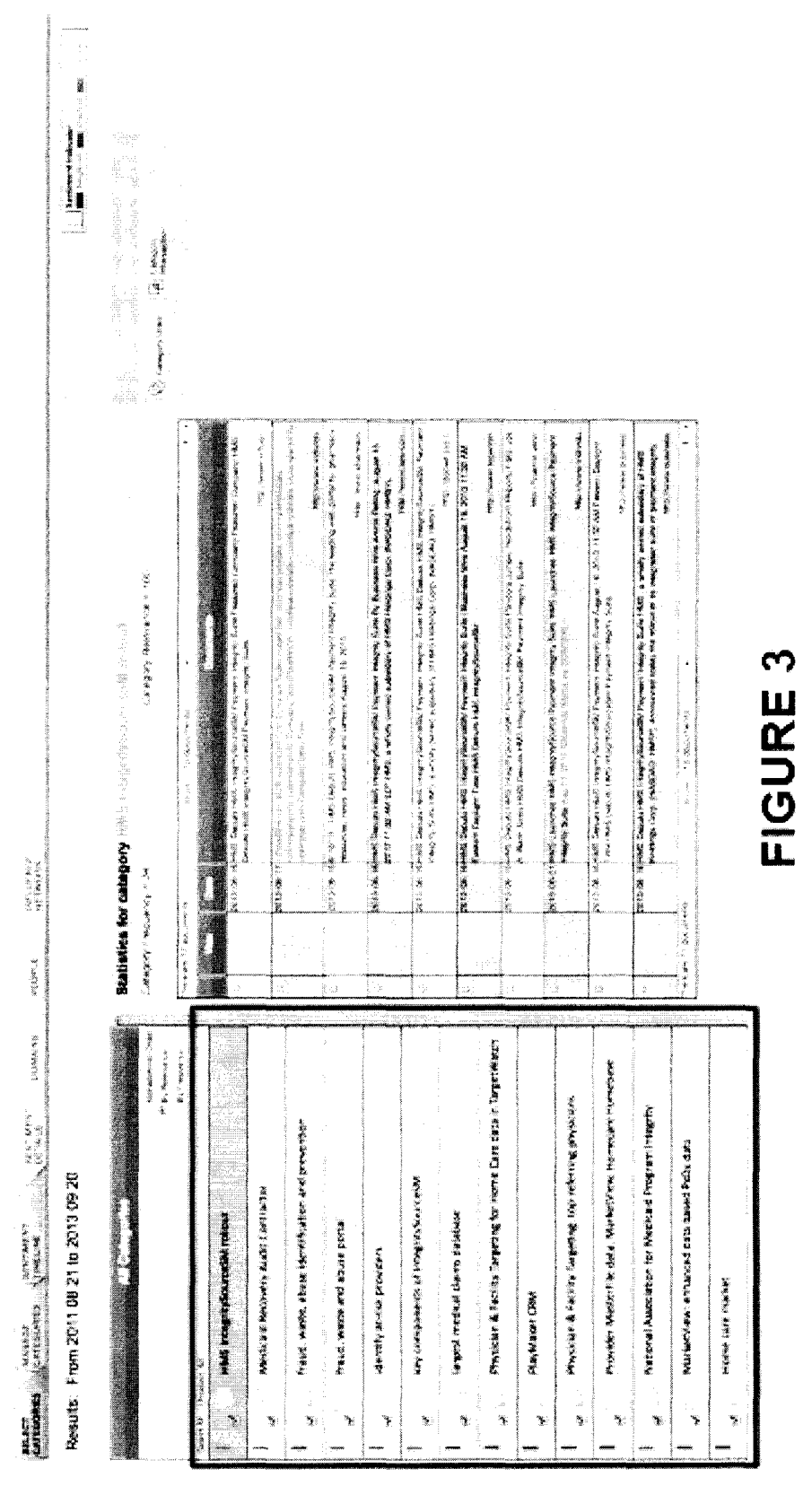

FIG. 3 is a screen shot of an interface to identify and select one or more facet in accordance with the present invention.

FIG. 4 is a graphical representation of semantic classification of social media user posts presented as individual facet semantic tag cloud in accordance with the present invention.

FIG. 5 is a graphical representation of user's posts interactions with categories in accordance with the present invention.

DETAILED DESCRIPTION

Figure 1:
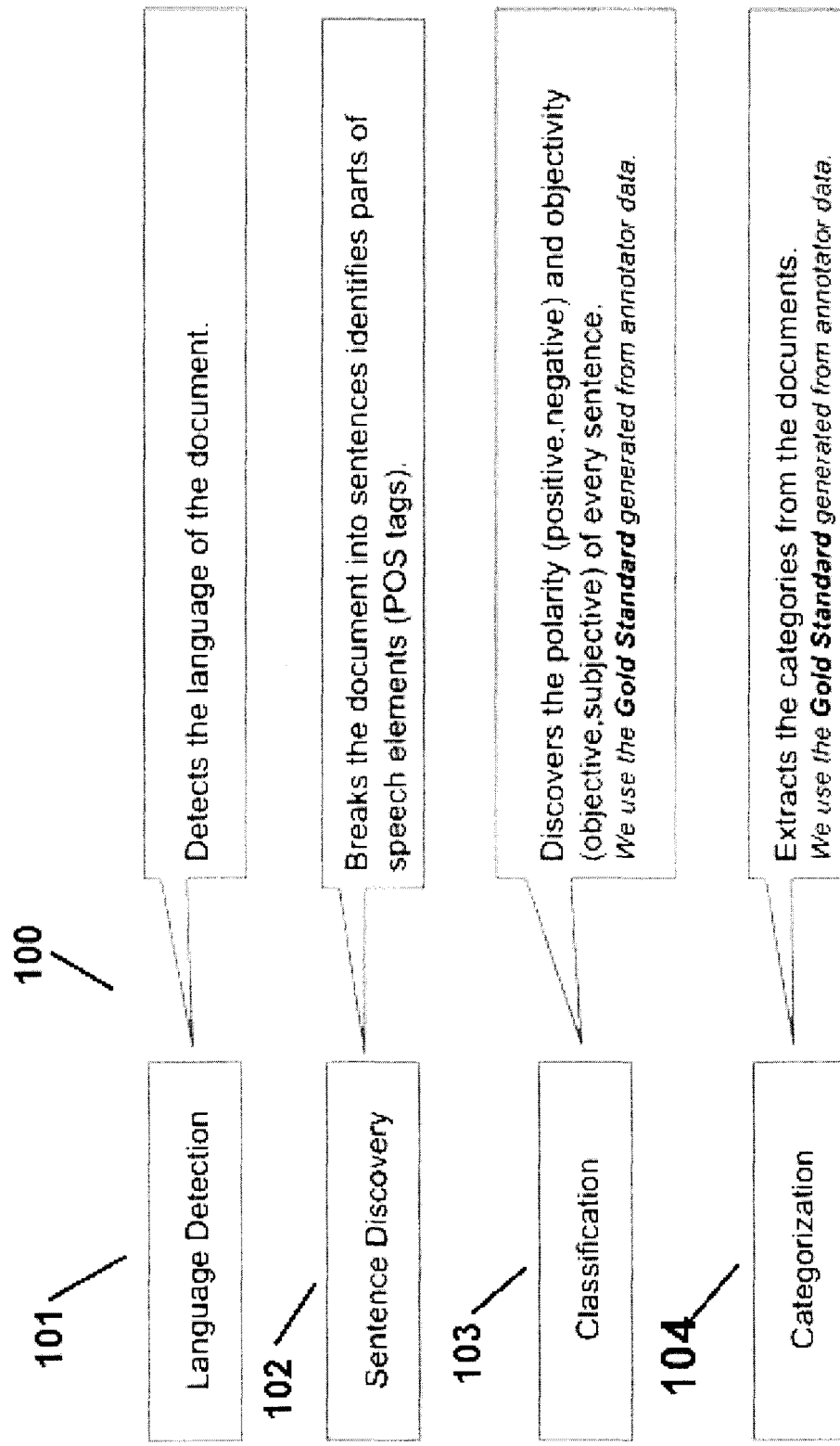
FIG. 1 is a workflow diagram of a method for indexing social media documents and analyzing text to automate classification of user posts using a facet based relevance assessment model in accordance with the present invention.

It is to be noted that before describing illustrative embodiments of the present invention, a glossary of technical terms is provided so as to help construe properly the technical terms used therein.

Glossary of Technical Terms

Data structure: it is a scheme for organizing and storing information data; examples of data structure are lists, tables, etc.;

Facet: it corresponds to a feature of an object; in case of a text object, it can represent a concept, a tag to the concept or to a category of topics;

Faceted classification: it allows the assignment of multiple classifications (or facets) to an object, enabling the classifications to be ordered in multiple ways, rather than in a single, pre-determined, taxonomic order.

Facet value: it is used to describe a facet;

Metadata: it is a piece of data used to describe a content of data;

Node: in tree structures, it is a point where two or more lines meet;

Ontology: it is a rigorous and exhaustive organization of some knowledge domain that is usually hierarchical and contains all the relevant entities and their relations;

Parsing (or syntactic analysis): it is the process of analyzing a sequence of tokens to determine the grammatical structure of the tokens with respect to a given formal grammar; a parser is the component of a compiler that carries out this task;

Reverse index: it is a data structure where all documents containing a particular word are stored, instead of storing the location of all words in a given document;

Taxonomy: it is the art of classification of things, which are frequently arranged in a hierarchical structure, typically related by subtype-supertype relationships, also called parent-child relationships; and Token: it is a categorized block of text (or text object) obtained through the lexical analysis, which consists of converting a sequence of characters into a sequence of tokens; programs performing lexical analysis are called lexical analyzers or lexers; for example, a lexer consists of a scanner and a tokenizer.

A novel method and system for monitoring social media and analyzing text to automate classification of user posts using a facet based relevance assessment model will be described hereinafter. Although the invention is described in terms of specific illustrative embodiments, it is to be understood that the embodiments described herein are by way of example only and that the scope of the invention is not intended to be limited thereby.

Generally stated, a search system and method according to a non-restrictive illustrative embodiment of the present invention allows not only to find results based on semantic concepts in response to a user's query but also to uncover unexpected links, which the user has never thought of or even imagined, between different conceptual units related to the user's query within a collection of documents. Also, by building a semantic index, through taxonomies and ontologies, it is possible for the user to extend or refine his/her search within the results given by the original search.

The Structure of the Semantic Index

Before describing the search system according to a non-restrictive illustrative embodiment of the present invention, the structure of the index which is used within the search system for semantic indexing will first be described.

Words and expressions are stored in the index along with fields determined by the nature of the word or expression (person, location, product, date, etc.) and each concept is then linked to an inter-lingual index in order to identify the possible corresponding conceptual units.

Key metrics are derived for each concept entry in the index and include, term frequency information, inverse document frequency, chi-square score, which are attributed to each concept, a unit of information derived from information gain, and a corpus level weighted average of the above metrics, and store this information score along with relative term frequency, and an average semantic density score of the documents in which the concepts occur.

Such an inverted index structure allows for building a faceted classification of documents so that related concepts are linked between each other. Using such a classification, relevant concepts associated with a user's query can be determined as will be explained hereinbelow.

The Search System

A non-restrictive illustrative search system and method for discovering or uncovering unexpected links between different concepts related a user's query during a search will be described.

More specifically, the search system comprises a semantic indexing server, and a query server, both of them connected to an interface, which is in turn connected to a result handler.

The semantic server pre-processes the data, i.e. indexing a collection of text objects according to their conceptual units and storing them in a semantic index. This index is used to match the queries from the users and for discovering related concepts. Of course the search system may include more than one semantic indexing server.

The query server receives and processes the queries coming from the users.

The interface allows the query server to communicate with the semantic indexing server. It is then possible for the query server to access the semantic indexing server so as to perform a search using the queries entered by the users.

Finally, the result handler provides the user with the results of the search conducted through the search system, by calculating the most relevant found semantic concepts. The results can be further narrowed down through the result handler so as to focus more specifically the search within a combination of related concepts, as will be explained hereinbelow.

Now, each element of the search system will be described in greater details.

The Semantic Indexing Server and Method

Figure 2:
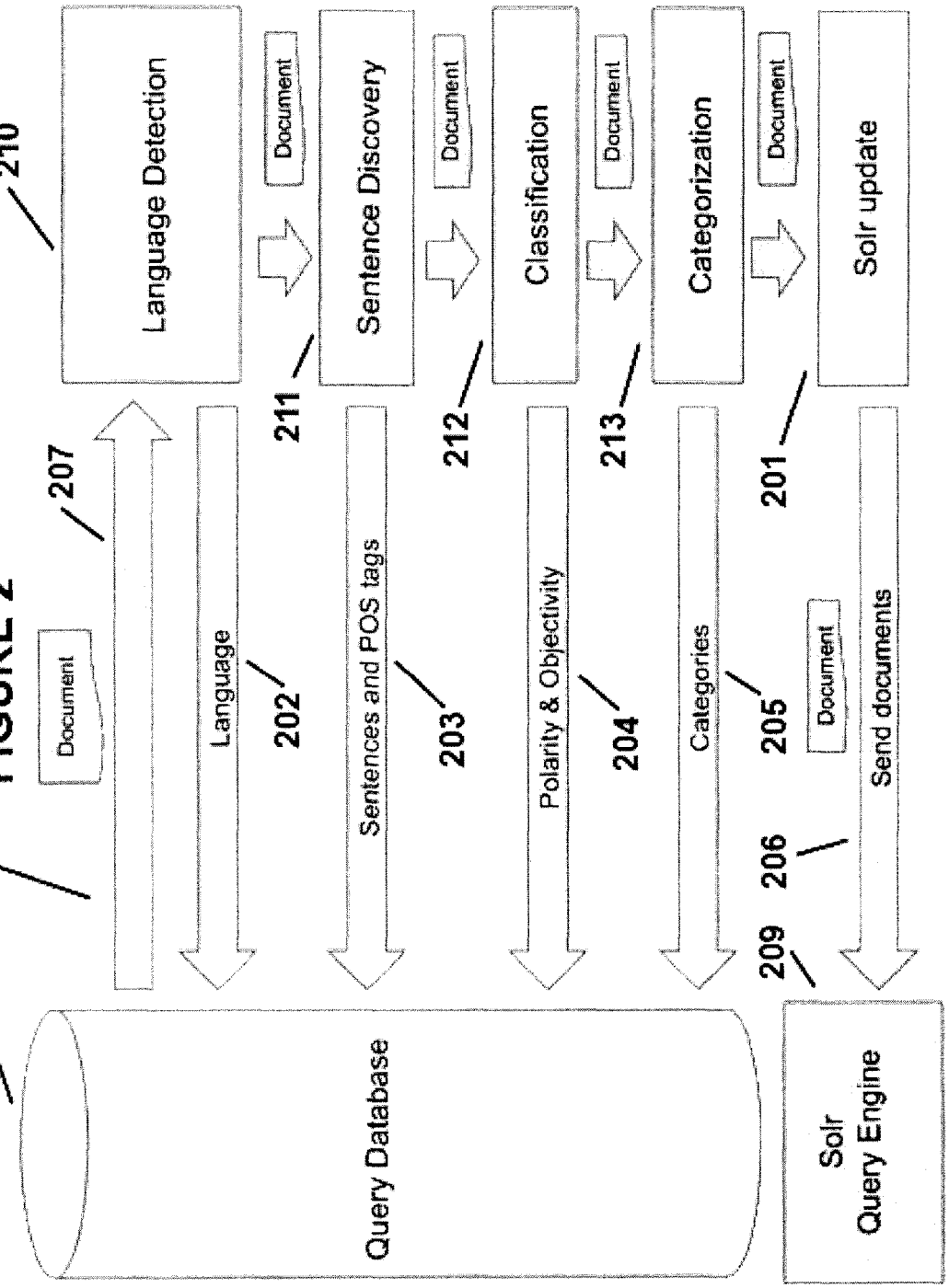
FIG. 2 is a workflow diagram of a search method for uncovering unexpected links between different concepts related to a user's query during a search in accordance with the present invention.

Referring to FIGS. 1 and 2, in a preferred embodiment, a system for indexing social media and analyzing text to automate classification of user posts using a facet based relevance assessment model semantic indexing server comprises a parser, a tokenizer, an identifier, an indexer and a storage component, for building an index of faceted classification of text objects, which can be searched through for answering the queries from the users. The semantic indexing server also uses ontologies and the taxonomies for building the faceted classification, which is dependent on the identification of concepts from keywords.

The step 102 is typically realized by executing the parser that separates a text document, such as a post or commented on a social media network or a website, into structural and individual text elements or text objects.

The tokenizer converts each text object or text element supplied by the parser into a sentences or group of sentences which are identified as POS tags. Furthermore, each POS tags can be analyzed so as to extract conceptual units contained therein.

The parser and the tokenizer are believed to be well-known devices in the art and will not be further described.

More specifically, the extractor or classifier is used to discover the polarity and objectivity 103 from each sentence or group of sentence, supplied by the tokenizer.

The indexer indexes the sentences or documents, according to their conceptual units, polarity and objectivity, and associates semantic tags to each of their precursors such that a faceted classification of text is obtained 104.

Finally, the storage element stores 208 the tokens together with their corresponding precursors, polarity, subjectivity and associated semantic tags in such a way that it is possible to uncover unexpected links between different concepts related to the user's post during a search in the semantic index, as will be described below.

The Query Server

The query server comprises a parser, a tokenizer, an extractor and an identifier.

The parser, the tokenizer, the extractor and the identifier are substantially the same as those described in the semantic indexing server. They also perform substantially the same task, respectively. In this case, the parser, the tokenizer, the extractor and the identifier work together so as to extract the conceptual units and determine the corresponding head concepts contained in the queries, provided by the tokens, entered by the users.

The Interface

The interface allows the query server to access the semantic indexing server so as to transmit the processed queries from the users or from web crawlers to the semantic indexing server.

The Result Handler

The result handler comprises a filter, and a calculator of scores and statistics.

The filter retrieves relevant answers from the indexing server in response to the queries analyzed by the query server.

The calculator of scores and statistics scores and ranks the answers obtained through the filter. The calculator can use a distance function for scoring and ranking the answers. For example, the calculator can use a simple proximity function known in the art to do so. However, the calculator can also use more complex functions to evaluate the scores and ranks of the answers, especially in the case when the collection of documents available for searches is large.

During a search, the precursors contained in a query are matched with nodes in semantic index. When there is a match, the precursors are linked with their corresponding nodes. It is then possible to determine which facets should be retained as potential candidates to be presented to the users, as will be explained hereinbelow. Furthermore, since each facet is linked to a plurality of facet values, those facet values are also shown to the users.

The facets and their associated facet values presented to the users can be used as filters for filtering the results so as to narrow down the search results. Also, those facets and their associated facet values correspond to the unexpected links presented to the users.

The Search Method

Now referring to FIG. 2, a search method for uncovering unexpected links between different concepts related to a user's query during a search is shown.

The method 200 starts with semantic indexing in order to generate an index of classified text objects, using a faceted-classification, through the semantic indexing server such as explained above and shown in FIG. 1.

Now referring to FIG. 2, the method 200 comprises a step for receiving one or more search input from a query database 208. Similarly to the method shown in FIG. 1, the language is detected 210 and stored 202 to the query database 208. The sentences 203 are stored to the query database 208 upon discovering the sentences from the search input 211. The polarity and/or objectivity data 204 of the input are stored in the query database 208 upon classifying the documents and/or sentence 212. The one or more categories 204 are stored in the query database 208 following the categorization of the search input 213. Upon categorizing the search input 213, a search index is updated 201. The search input document is then sent to the indexer by sending the documents 206 to the search system 209.

The query 207 provided by the user is analyzed through the query server so as to extract the conceptual units contained in the query for a search thereof.

The search is conducted in the search system 209 using the index constructed as previously described.

Next, a set of search results is obtained through the result handler.

The set of search results is divided into two lists. A first list includes the unexpected links uncovered during the search and which are used to filter the result elements which are provided by a second list. Therefore, the set of search results can be presented to the user in the form of a browsable tree structure, displaying the list of unexpected links between different concepts in a first column and the list of result elements in a second column, for example. The user can then refine and narrow down the set of search results to one of the specific sub-categories listed in the first column, for example. To do so, the user can just click on the related concept that he/she is interested in (for example a particular item in a sub-category), from the first list of unexpected links uncovered during the search. Then, the results corresponding to that sub-category are displayed in the second column from the second list of results. The user can always go back to the original search results by clicking back on the category corresponding to the sub-category clicked by the users, in the list of unexpected links Semantic Indexing The semantic indexing comprises tokenizing, parsing, identifying a head concept, indexing and storing the text objects in the storage in the form of a reverse index.

Now referring to FIG. 1, a method for indexing social media documents and analyzing text to automate classification of user posts using a facet based relevance assessment model 100 is shown as high level steps. The method 100 comprises the steps to detect language of one or more documents 101, to discover one or more sentence within the one or more documents 102, to classify the documents or sentences by discovery the polarity, such as positive or negative, or objectivity, such as objective or subjective, of the discovered sentences 103 and to categorize the documents by extracting the categories from the documents.

For each concept identified, key metrics identified in [0039] serve to compute the units of information associated to the concept or the category to be used to classify user posts, as well as to identify of those concepts that occur in the same user posts, which co-occur across the same ontologies or taxonomies, and have a reinforcing effect in determining the subject or topic at hand. These scores are compared to corpus level weighted averages of the above metrics, in order to determine which categories contribute the most information to a given a post and correspondingly, which user posts are potentially the most relevant.

The step to discover one or more sentences within the one or more documents 102 typically comprises the steps to identify the parts of speech elements, such as using POS tags, and to split the document into sentences based on the identified part of speech elements.

For example, text objects are a collection of symbols organized into words, which are grouped into sentences. The sentences, with the use of punctuation marks, form paragraphs. The text objects are typically made up of several such paragraphs, to thereby form a complete text document.

Also, each text object being processed during semantic indexing is first identified and associated to a specific theme. Therefore, each text object is assigned to a specific conceptual unit, which identifies the main topical content thereof.

The text object is tokenized 102, meaning that the main structural elements in the text objects are identified and then separated into individual elements, called tokens, to thereby obtain a sequence of tokens, meaning the separation of sentences into individual words or expressions. Tokenizing is done through the tokenizer.

The sequence of tokens is parsed using the parser so as to extract the conceptual units contained in the tokens 102. More specifically, the sequence of tokens is analyzed so as to determine whether the tokens form a valid noun-phrase (NP), an idiomatic expression (such as "burn the midnight oil"), a collocation, or just a single word, such as a keyword, each of the terms representing a conceptual unit.

For each valid combination of tokens including a conceptual unit, a head concept, called precursor, is further determined through a binding process. For example, in the noun-phrase corresponding to "laser printer", the determined head concept would be "printer"; in the expression to "burn the midnight oil", the head concept would be "burn the midnight oil" since this is an idiomatic expression, i.e. the meaning of the expression cannot be interpreted from each of its individual words. More specifically, the binding process associates a precursor to an expression, in form of tokens, occurring in a text document. This can be accomplished as follows.

Then, a hash table of concepts defined in the relevant topic-specific taxonomies can be used to identify potential matches with the expression in the text document. Once a series of reasonable candidates has been identified, the surrounding expressions of the text document are also analyzed so as to also yield potential matches or semantic reinforcement in the taxonomies or topic-specific taxonomies. Then, a distance function computation is used to determine which candidate of the series of reasonable candidates is most likely the head concept of the expression, i.e. the head concept that is believed to best represent the expression in its intended meaning within the context of the text document.

Next, indexing and linking each text object to its respective relevant concepts identified in the topic-specific taxonomies are performed by applying category tags, corresponding to the respective relevant concepts of the topic-specific taxonomies, to each of the text object.

More specifically, the category tags or semantic tags correspond to the facets, which represent a conceptual unit contained in the text object processed.

Each document or user post comprises a fixed set of semantic tags associated with the said document or user post. The tags are ordered based on computed values of unit of information, relative term frequency, and the average semantic density score. The latter reflects presence within targeted industry specific taxonomies, as well as ranking based on statistical co-occurrence of tags in the user posts and concomitant membership in one or several taxonomies.

The taxonomies need not to be exhaustive as the statistical co-occurrence and information gain scores pet tag help to indicate the "cloud" of strongly related tags such as the semantic tag cloud presented in FIG. 4. Rather than needing to rely on the presence of the original tag in one or several taxonomies, examination of presence of all members of the tag cloud, can ensure much more reliable identification of the of the relevant industry or subject matter. This in turn, means several much smaller taxonomies may be developed in order to cover the most important concepts per industry or topic and extend them in a semi-supervised manner based on resulting real-time tag clouds. This also allows the system to present relevant facets to users, that may and do evolve over time. This unique approach to identifying most relevant themes, coupled with scoring based on search engine metrics (normalized inverse document frequency for example), will yield surprisingly accurate facets, irrespective of the degree of completeness of taxonomies or ontologies.

Once all the text objects have been processed in the semantic indexing server, the results of indexing are stored in the storage element in the form of a reverse index. The reverse index stores all the connections and associations of conceptual units related to a particular precursor.

More specifically, storage of the reverse index is performed as follows, in reference with the above given examples:

Every text object, such as a noun-phrase, is stored in the reverse index at a given position along with its text object identification tags, such as the vertical metatag corresponding to the theme of the text object;

Facet value fv is associated to the noun-phrase as a semantic tag and is therefore stored at the same given position in the reverse index;

Key metrics determine which facets will be presented to the user subsequent to the completion of analysis of the user's query;

Once the reverse index is built using a faceted classification of the text objects, the reverse index is ready to be used for answering the queries from the users.

However, it should be understood that there are other ways to store the processed text objects, such as using regular databases, tabular lists, etc. Of course these storing solutions should offer the same ability of storing a semantic index in such a way as to enable the users to narrow down and refine their search results easily and efficiently.

Query Analysis

When a user wants to initiate a search, a series of keywords are entered. These keywords are referred to as a query string, which is then submitted to the query server. Upon receiving this query string, the query server performs an analysis on the text objects contained in the query string in order to determine the conceptual ideas provided by the text objects. Therefore, essentially the same operations as described in the semantic indexing are performed on the query string.

First, the query string is tokenized and parsed. Then, the conceptual units and precursors in the text objects are determined. The precursors are identified along with their corresponding links to facets and facet values using the taxonomies and ontologies.

Once the precursors in the query string are determined, the query string is reformatted and put into query data structures, comprising two lists: a list for containing the identified query elements and another list for containing the filtering elements.

For example, the query elements may comprise the determined keywords, noun-phrases, precursors, facet values, facets, or even user names, etc.

Query Search

The two lists corresponding to the reformatted query string are then submitted through a user interface, which has access to the semantic indexing server for searching purposes in the reverse semantic index.

Each element from the query element list is searched in the reverse semantic index. Each time that a match is found between the query element and a text object in the reverse index, the query elements and the corresponding identified text objects are accumulated in an answer set. For example, the matching process can use a facet as the matching criterion.

It should be noted that in addition to the text objects having facets directly linked to the query elements or precursors, text objects with related facets from related precursors can be also accumulated in the answer set.

For example, suppose that a noun-phrase AB yields two facet values fv(A) and fv(B) respectively. When a user enters a query for the term A, text objects containing fv(A) will be identified and accumulated in the answer set. However, through the link between the precursor p(A) and the noun-phrase AB, it can be inferred that text objects containing fv(B), which are also linked to the noun-phrase AB, may be of potential interest to the user, therefore, the text objects containing the facet values fv(B) are also accumulated in the answer set.

Of course, in case where a noun-phrase AH exists and has been indexed by the semantic indexing server and which yields a precursor p(A) and a precursor p(H), the text objects containing facet values fv(H) associated with p(H) will also be accumulated in the answer set, when the user enters the query for the term A.

Furthermore, for all the facets identified through direct links or inferred from the direct links, their respective corresponding facet values are also identified. Then, the text objects associated with those facet values are also accumulated in the answer set. This is called synonym aggregation.

By so doing, it is then possible to present to a user, in response to a given query, combination of concepts semantically related to the given query so as to allow the user to discover semantically linked information.

Once all the elements of the query element list have been searched, the resulting answer set and the filtering elements are submitted to the result handler Results The filtering elements consist of thresholds computed dynamically, based on term frequency, relative term frequency, normalized inverse document frequency, mutual information and information gain scores.

Furthermore, for each element remaining in the answer set, a score and a statistical analysis are performed through the calculator of scores and statistics so as to determine the most relevant facets to present to the user, in response to his/her query.

The calculator of scores and statistics uses a distance function or proximity function within the taxonomies to score and rank each element in the answer set.

Also, the frequency of occurrence of each element within the same document is computed through the calculator of scores and statistics.

The elements which obtained the highest scores and ranks and/or the elements that occur the most frequently in the documents are included in the search result set, which will be presented to the user. Also, the facets and facet values linked to the precursors extracted from the query string are included in the search result set.

Refining

Once the search result set is obtained, which includes a list of unexpected links and a list of result elements, the search result set is displayed in such a way that they are interactive with the user. Usually, the list of result elements and the list of unexpected links are presented in a browsable, clickable tree structure, such as the familiar folder structure in personal computers, which allows the user to select specific facets of interest in the list of unexpected links, so as to refine the query. Indeed, the list of unexpected links, uncovered during the search allows the user to explore and discover different combinations of concepts related to the original query.

As an example, the query entered by the user might be "global warming". The search system returns N results which are then presented to the user. Under the facet (or category) "global warming" a list of facet values associated with the parent facet are displayed, such as "anthropogenic causes", "energy conservation", "global climate model", etc.

In order to refine the query, the facet value chosen by the user is added to the filtering list in the filter. Therefore, elements in the search result set that are not related to that added facet value are removed from the result set, so that the user is presented with narrower search results corresponding to the selected facet value of interest. However, the user can go back to the previous and larger search result set and then choose another facet value to explore, and so on and so forth.

By so doing, the number of results returned by the search system can be reduced to a more specific set. The user can click on any of the facet values listed in order to refocus his/her search with another combination of semantically related concepts.

At any time, the user can save the results of his/her query by using a save function.

Example of the System Architecture

Figure 5:
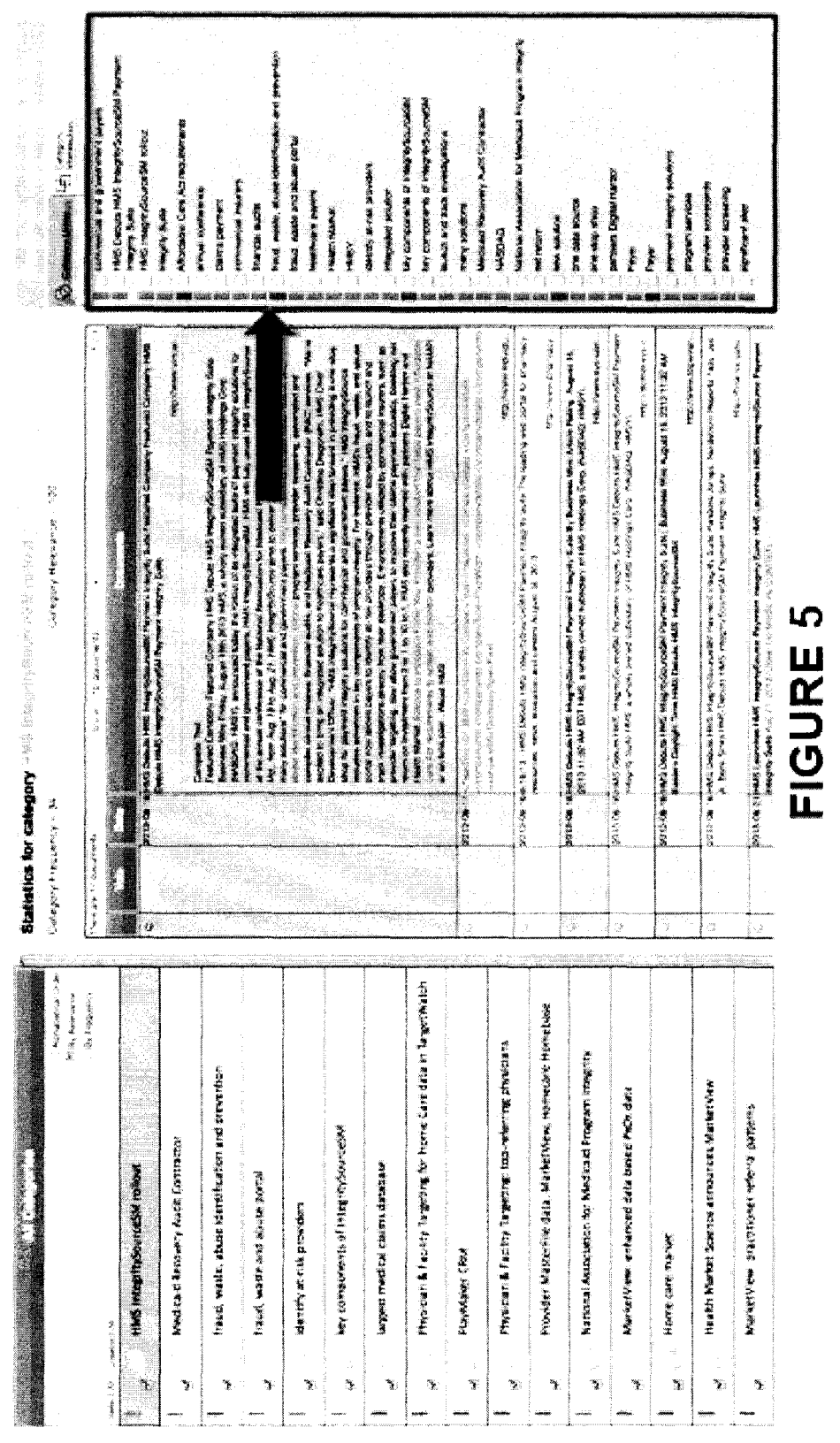
Figure 6:
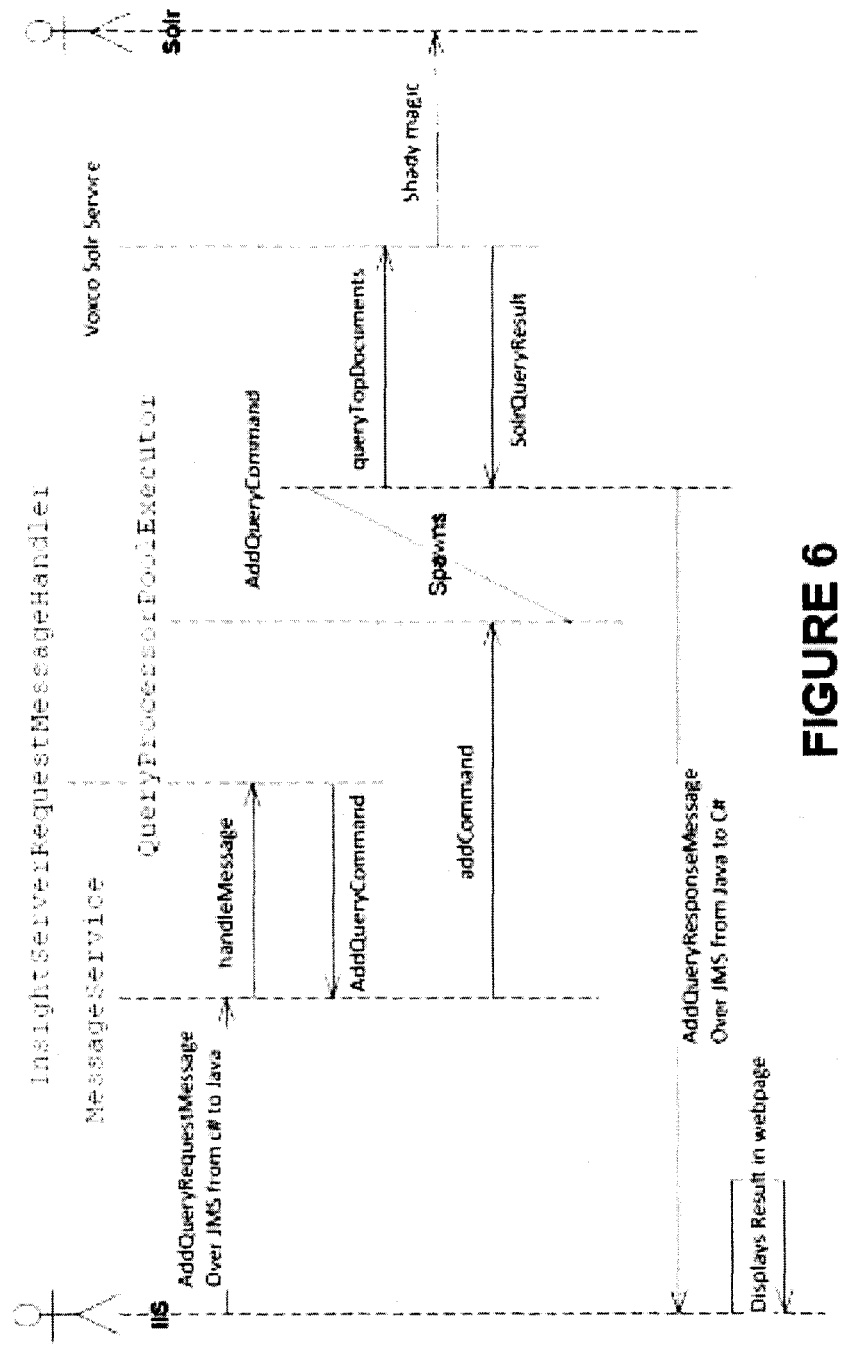
FIG. 6 is a state diagram of a method to handle a query from a web server, such as IIS in accordance with the present invention.
Figure 7:
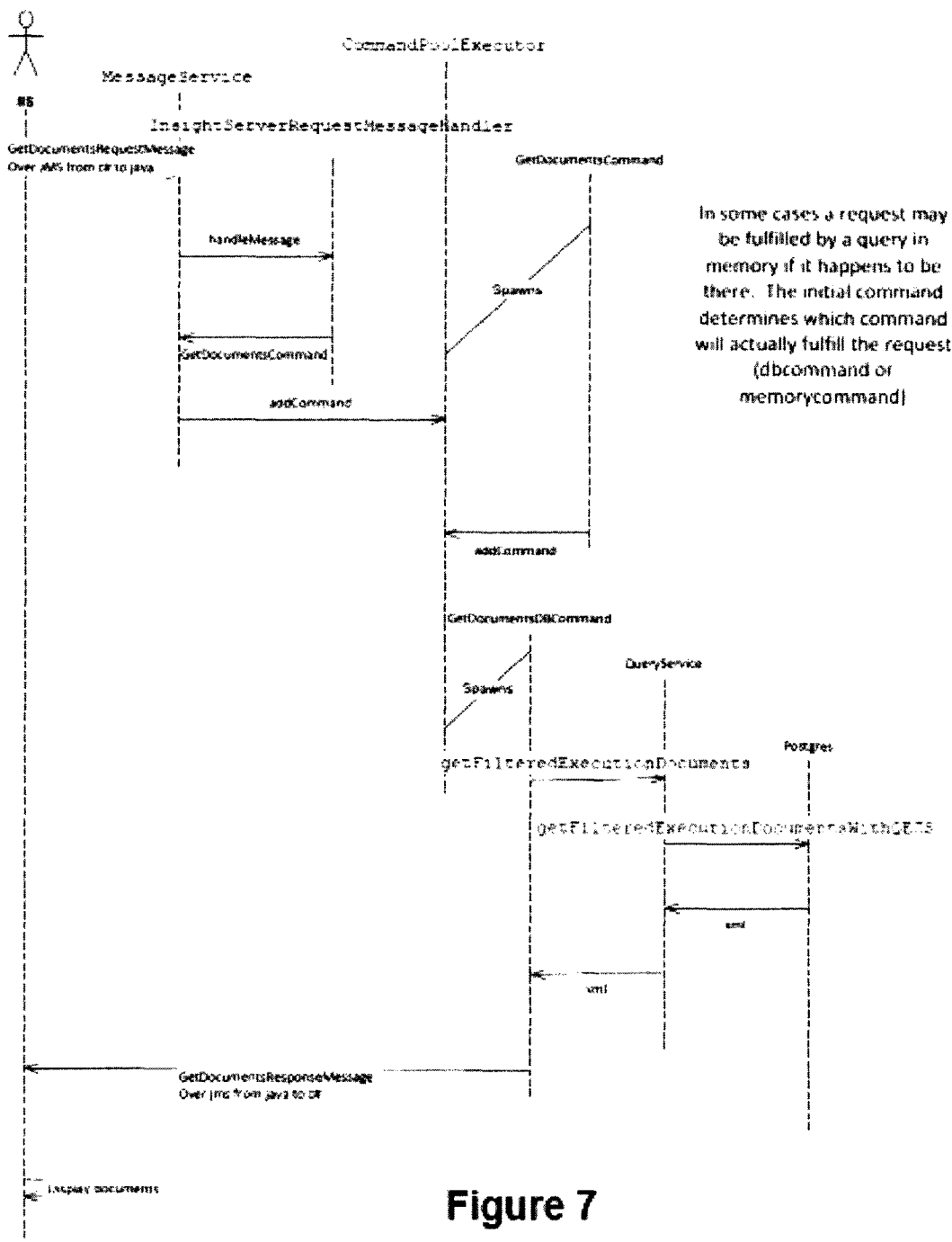
FIG. 7 is a state diagram of a method for a web server, such as IIS, to retrieve results matching a query in a classified index in accordance with the present invention.
Figure 8:
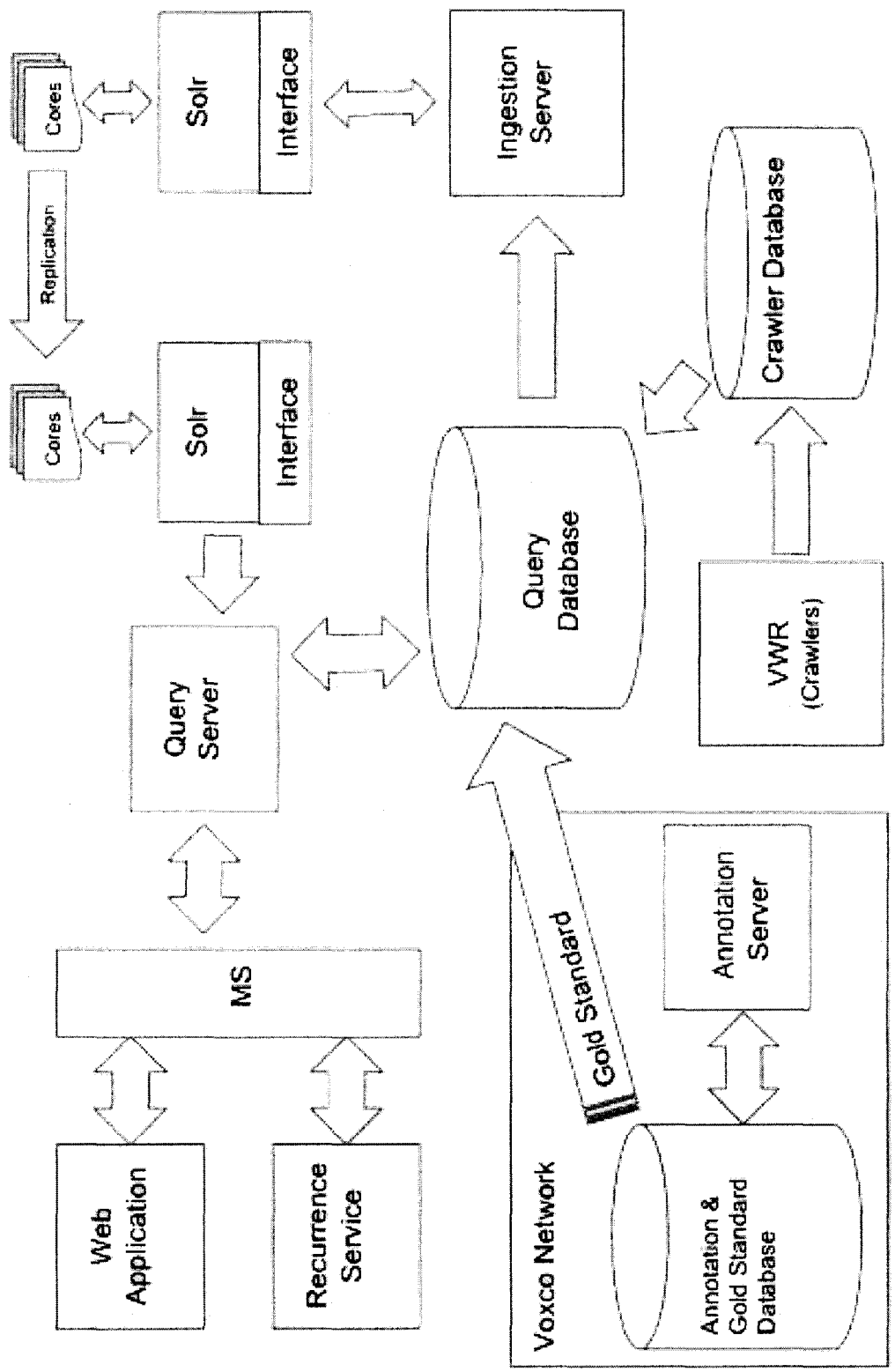
FIG. 8 is a workflow diagram of a method for indexing social media documents and analyzing text to automate classification of user posts using a facet based relevance assessment model in accordance with the present invention.

Now referring to FIGS. 5, 6 and 7, in a preferred embodiment, the system architecture comprises a plurality of high-performance servers hosting data source services, a plurality of high-performance servers used for semantic categorization, semantic indexing (tagging of part-of-speech, offset, semantic tags and key metrics to each concept identified), and query handling, a plurality of additional high-performance servers used for the inverted semantic index and for temporary crawled data storage, a plurality of several warm standby servers hosting the databases; a configuration of a plurality of light servers and/or virtual machines used for internal web crawlers, such as 8 machines running an operating system, such as Windows, Linux or Mac, one or more web server, such as IIS or Apache HTTPD, one or more temporary web crawl database storage and a scheduler server, one Network Appliance (NAS device) having high performance bandwidth, such as multi-terabyte, to be used for extensions to inverted index storage.

Figure 9:
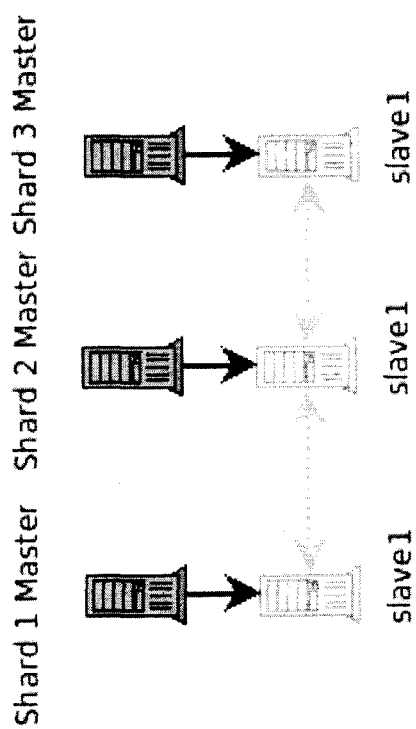
FIG. 9 is a diagram presenting semantic categorization server configuration wherein a multiple master-slave architecture is used to maximize processing efficiency of indexers and query handlers.

In typical embodiment, the system shall comprise at least four (4) data source servers having a configuration with multiple core, high memory, such as at least 128 GB RAM allowing at least 10 TB SAN storage, In such a typical embodiment, the system comprises at least 5 servers for semantic categorization, each comprising multiple core processing units, a large amount of memory, such as at least 128 GB RAM. Now referring to FIG. 9, typically, such servers are configures using a sharding approach using multiple master-slave architecture in order to maximize processing efficiency of indexers and query handlers.

Referring back to the typical embodiment, at least two additional high-performance servers shall comprised in the configuration, such servers typically comprise a plurality of multiple core processing units, a large quantity of memory, such as at least 128 GB RAM.

In a preferred embodiment, the communication between the system components uses the following protocols: HTTP/HTTPS for communication between client device browser to web server exchange; native communication between web browser and crawl database server; messaging system, such as, but not limited to, jms over TCP for data exchange between web browser and query server(s); http/search index framework, such as but not limited to SOLR, an application server or application container server, such as tomcat, for data transfer between query server(s) and semantic index server(s); a database communication tier. such as, but not limited to jdbc, for data transfer between query server and semantic classification database server. In a preferred embodiment, no direct web access to data is envisaged; as described above, data exchange passes through web server/messaging system/query server/messaging system layer. One skilled in the art shall understand that another embodiment may use direct web access to data in order to reduce the number of application layers.

The one or more web servers connect to the one or more query Server application via a messaging system, such as using modified WOX Serialization to convert java object to XML to c# Objects and vice versa The user interface of the system is typically web based and based on ASP.NET or Java technologies. The query server runs an application that handles all queries from the one or more web servers and that retrieves necessary data from the one or more semantic index servers and plurality of database servers, consolidates data, performs calculations detailed above, and returns the required code or interface to display data to the one or more web servers.

The one or more web servers handle all authentication procedures and store all user data and metadata to any database servers. When a query is run for the first time, the one or more query handler servers process query terms/concepts, send identified concepts to the semantic index framework which processes a limited set of user posts (from the most relevant posts identified) and returns said posts along with an initial set of categories (facets) based on relevancy computations as previously detailed. User review is allowed prior to fully processing the query. Significant improvement to relevance calculation may result from this revision step.

On reception of a user's request, the Query Server(s) fully processes the submitted query. All relevant documents are retrieved from the semantic index framework and relevance computations and semantic facet scoring are computed as detailed previously. The resulting dataset is then processed by the query application servers which create an in-memory model of the query to perform the necessary calculations. Calculations, as detailed previously, comprise the following steps: determining category sentiment, such as using alternate methods described by other prior art documents, category pairing at the sentence level, category pairing at the document level, category/domain pairing, category/author pairing and author importance. This summarized information is then stored in database servers and used by the one or more web servers, via the query application, to display/manipulate data. Semantic category management and sentiment correction management will require some level of query reloading in memory to reprocess the summary calculations.

Although the present invention has been described in the foregoing specification by means of a non-restrictive illustrative embodiment, this illustrative embodiment can be modified at will within the scope, spirit and nature of the subject invention.

The invention claimed is:

1. A grid-computing implemented method for automated classification of documents and to automate classification of users posts provided on a network, the method using information theory and semantic density for feature reduction, the method comprising:
  a) detecting the one or more languages of the documents to be classified;
  b) discovering one or more sentences within the one or more documents;
  c) executing term reduction of the terms based on information gain and information theory, allowing for scoring of semantic richness of terms and expressions;
  d) ranking and scoring terms and expressions based on industry specific relevance scores founded on normalized relative units of information;
  e) enumerating corresponding categories;
  f) classifying text objects contained in the documents using a faceted classification and by discovering the polarity and objectivity of the documents;
  g) categorizing the documents by extracting the categories from the documents;
  h) organizing the categories using automated taxonomic structuring.

2. The method for automated classification as claimed in claim 1, wherein the step to discover one or more sentences within the one or more documents comprises the steps to identify the parts of speech elements (POS).

3. The method for automated classification as claimed in claim 2, wherein the step to identify the parts of speech further comprises focusing on verb tenses and "intensity modifiers".

4. The method for automated classification as claimed in claim 1, wherein classifying text objects using a faceted classification are organized into a formal multi-tiered semantic taxonomy.

5. The method for automated classification as claimed in claim 4, wherein classifying text objects using a faceted classification further comprises grouping, ordering and ranking words and expressions within specific semantic clusters based on semantic proximity and units of information.

6. The method for automated classification as claimed in claim 1, wherein each document to be classified comprises a fixed set of semantic tags associated with the said document.

7. The method for automated classification as claimed in claim 6, wherein the semantic tags are ordered based on computed values of unit of information, relative term frequency and the average semantic density score.

8. A grid-computing implemented method for conducting a query-based search in documents having been automatically classified, the method using information theory and semantic density for feature reduction, the method comprising:
  a) receiving one or more search input;
  b) detecting the language of the query-based search;
  c) discovering one or more sentences in the query-based search;
  d) classifying text objects contained in the query-based search using semantic proximity, information density and polarity and objectivity scores of the query-based search concepts using an information theory and natural language approach;
  e) categorizing the query-based search by extracting the categories from the query-based search;
  f) updating a search index based on monitoring of changes made to the query through successive iterations allowing for continuous machine learning based updates to semantic indexes;
  g) executing a search to match classified and categorized query-based search in the documents.

9. A method for conducting a query-based search in documents as claimed in claim 8, the method further comprising storing in a data source the detected language, the discovered one or more sentences, the discovered polarity and objectivity, the one or more categories, respective parent-child relations of the one or more categories, information density and semantic density scores.

10. A method for conducting a query-based search in documents as claimed in claim 9, wherein the search input is analyzed through a query server so as to extract the conceptual units contained in the query for a search input thereof.

11. A method for conducting a query-based search in documents as claimed in claim 8, wherein the matching search results are obtained through a result handler.

12. A method for conducting a query-based search in documents as claimed in claim 11, wherein the matching search results are divided into two lists, a first list comprising the matching search results uncovered during the search obtained through a result handler and a second list comprising the extracted categories.

13. A method for conducting a query-based search in documents as claimed in claim 12, wherein the matching search results are presented as a browsable tree structure.

14. A system for conducting a query-based search in documents provided on a network, the system comprising:
  a) a semantic indexing server, wherein the semantic indexing server is configured to:
    i) detect the one or more languages of the documents to be classified;
    ii) discover one or more sentence within the one or more documents;
    iii) execute term reduction of the one or more sentence based on information gain and information theory to allow scoring of semantic richness of terms and expressions;
    iv) rank and score terms and expressions based on industry specific relevance scores founded on normalized relative units of information;
    v) enumerate corresponding categories;
    vi) classify text objects contained in the documents using a faceted classification and by discovering the polarity and objectivity of the documents;
    vii) categorize the documents by extracting the categories from the documents;
    viii) organize the categories using automated taxonomic structuring;
  b) a query server configured to identify the determined precursor in the faceted classification; and
  c) a result handler configured to return both a set of text objects related to the identified precursor and a set of unexpected results defined by facets and facet values associated with the determined precursor.

15. A system for conducting a query-based search in documents as claimed in claim 14, wherein the system further comprises a query server configured to:
  a) receive one or more search input;
  b) detect the language of the query-based search;
  c) discover one or more sentences in the query-based search;
  d) classify text objects contained in the query-based search using semantic proximity, information density and polarity and objectivity scores of the query-based search using information theory and natural language approach;
  e) categorize the query-based search by extracting the categories from the query-based search;
  f) updating a search index based on monitoring of changes made by user to the query through successive iterations allowing for continuous machine learning based updates to semantic indexes;
  g) executing a search to match classified and categorized query-based search in the documents.

16. A system for conducting a query-based search in documents as claimed in claim 15, wherein the system further comprise a query data source configured to store the detected language, the discovered one or more sentences, the discovered polarity and objectivity, the one or more categories in a data source.

17. The method for automated classification as claimed in claim 16, wherein verb tenses and "intensity modifiers" are selected from the group of adverbs or adjectives.

* * * * *